March 17, 1936.　　　　A. P. BALL　　　　2,034,078
SEAT BACK SPRING
Filed July 10, 1933　　　2 Sheets-Sheet 1
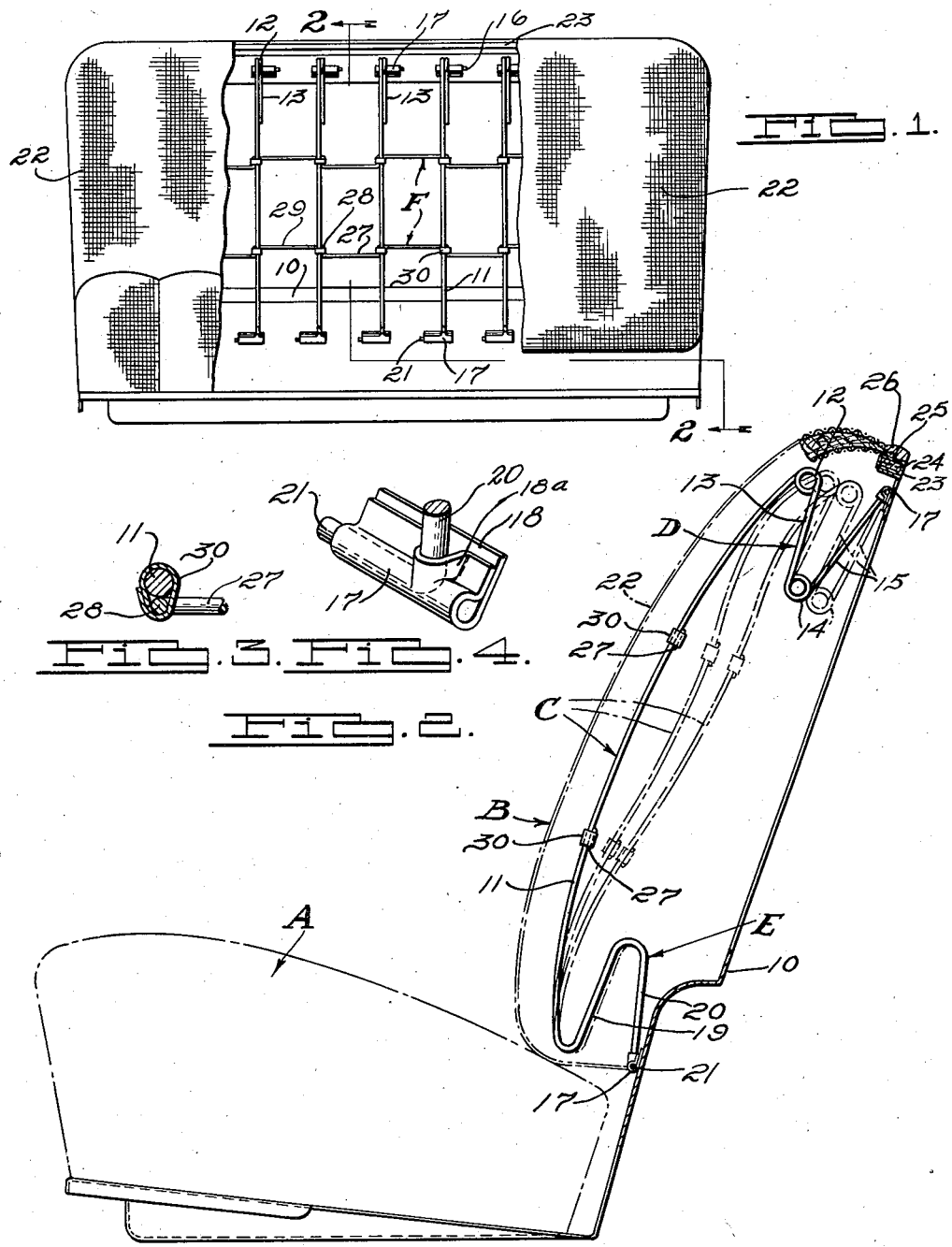
INVENTOR
Albert P. Ball.
BY Dike, Calver & Gray
ATTORNEYS

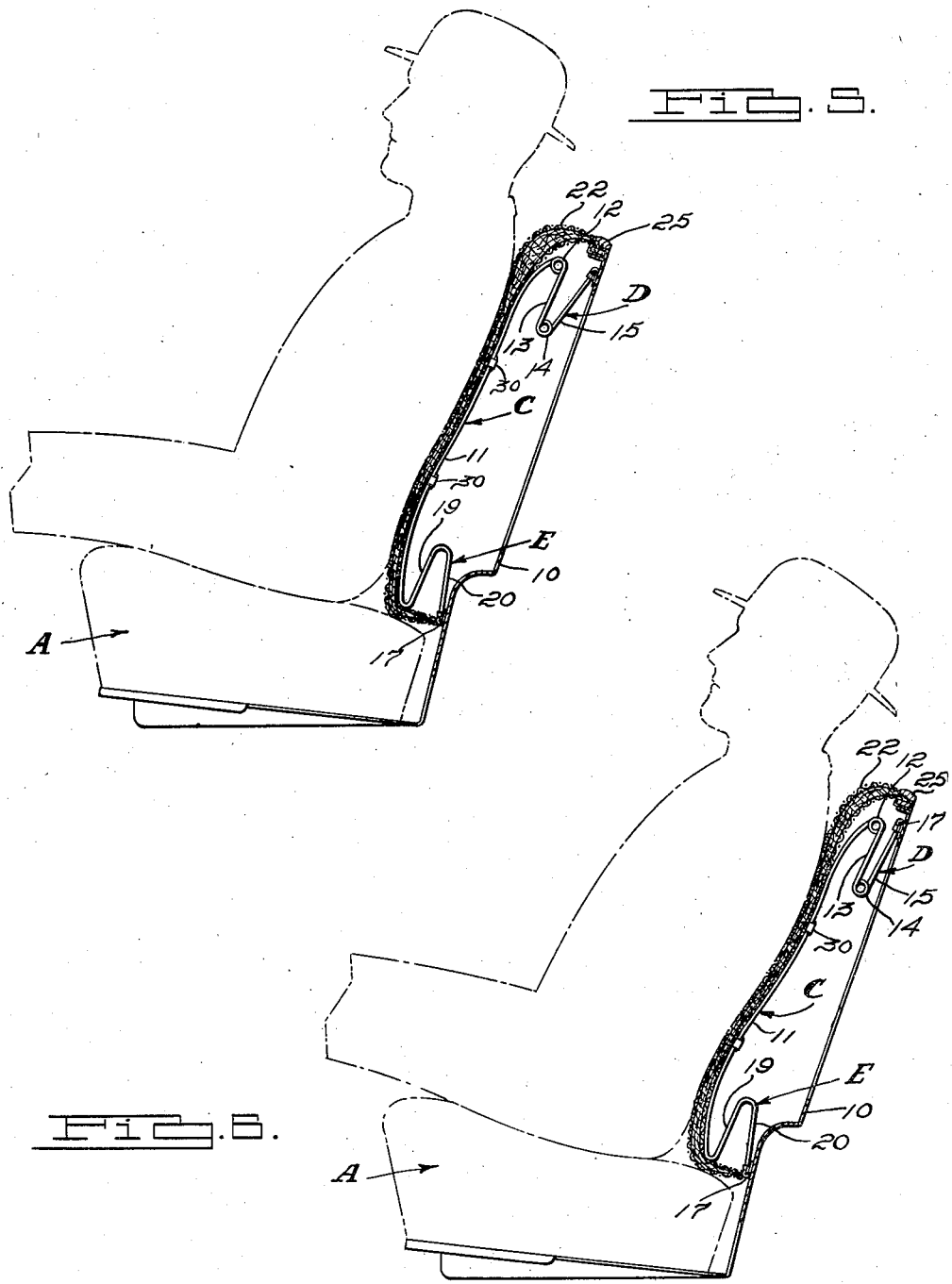

Patented Mar. 17, 1936

2,034,078

UNITED STATES PATENT OFFICE 2,034,078

SEAT BACK SPRING

Albert P. Ball, Detroit, Mich., assignor to Briggs Manufacturing Company, Detroit, Mich., a corporation of Michigan Application July 10, 1933, Serial No. 679,600

2 Claims. (Cl. 155—179)

This invention relates particu'arly to seat back springs or cushioned back rests for vehicles, such for example as automobile bodies, an object of the invention being to provide a spring back structure which will be relatively simple and inexpensive to manufacture and constructed so as to yield under pressure in such manner as to conform to the contour of the back of the occupant while providing an effective support for the back, thereby producing a yieldable structure having improved riding qualities.

A further object of the invention is to provide a spring back structure of the type composed of a series of transverse wire formed spring members provided at opposite ends with inwardly bowed leg sections preferably bent into more or less zigzag fashion, the improved construction being such that the upper and lower sides of the structure are unbalanced as to their relative degrees of compressibility.

Another object of the invention is to provide a spring structure of the foregoing type in which the resistance of the springs to pressure progressively increases from the center thereof toward both the top and the bottom edges but at a disproportionately greater rate toward the bottom than toward the top, thereby providing a structure which will yield at all points in its height under pressure when the passenger of the car leans thereagainst with more or less force, yet which will resist pressure increasingly from the shoulder regions of the passenger downwardly to the regions at the small of the back where the maximum resistance will be applied.

Other objects of this invention will appear in the following description and appended claims, reference being had to the accompanying drawings forming a part of this specification wherein like reference characters designate corresponding parts in the several views.

Fig. 1 is a front elevation partly broken away illustrating a seat back structure embodying the invention.

Fig. 2 is a section taken substantially through lines 2—2 of Fig. 1 in the direction of the arrows.

Fig. 3 is a detail section illustrating a tie wire connection.

Fig. 4 is a detail perspective view illustrating the connecting means for the ends of the spring members.

Figs. 5 and 6 are sectional views somewhat similar to Fig. 2 and illustrating different positions taken by the spring members under pressure when the seat is occupied.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings wherein I have illustrated a present preferred form of the invention, there is shown a seat particularly adapted for an automobile vehicle and including a seat unit A of suitable spring construction having an upright back rest B embodying the present invention. The back B comprises a suitable base frame 10 which in the present instance, is in the form of a skeleton metal frame of rectangular formation. Mounted on the base 10 are a series of parallel spring members C. Each of these spring members comprises a length of wire shaped to provide an outer preferably crowned course 11 extending substantially the width of the back unit, each of these courses 11 terminating at its upper end in an inwardly bowed substantially zigzag leg section D and at its lower end in a similar leg section E.

In forming the upper leg sections of the spring members C the wire at the upper end of the crowned course is bent to provide a spring coil 12. Thence the wire is bent inwardly at an oblique angle to provide a portion 13 terminating in a spring coil 14. Thence the wire is bent rearwardly to provide an oblique portion 15 extending to the base 10. Thus the leg section, in this instance, is bowed to provide zigzag portions 13 and 15 having spring coils 12 and 14 in their length. The end of the leg portion 15 is bent laterally at 16 for connection to the frame 10 by means of a metal retaining clip or clamp 17. This clamping member is stamped into channel shape to provide a flange 18 secured, as by spot welding, to the framing 10. The outer flange of the clamp 17 is pressed so as to clinch over the bent end 21 of the wire and also to embrace opposite sides of the wire 11 as shown at 18a in Fig. 4. Thus the end of the spring is firmly held in position against longitudinal displacement but in such manner as to permit the lateral end portion 21 to rock slightly within the bearing formed by the clamp 17.

The crowned course 11 of each spring member is inwardly bowed at its lower end to provide substantially zigzag portions 19 and 20, the free end of the portion 20 being bent to provide a lateral projecting portion 21 secured to the framing 10 by means of a clamp 17 in the same manner as illustrated in Fig. 4.

In the present preferred form of the invention the outer parallel wire courses 11 are secured together in spaced relation so as to resist any substantial longitudinal displacement of the members. This is accomplished preferably by means of wire ties F, each comprising a length of wire extending longitudinally immediately beneath the courses 11. Each wire tie F is formed in substantially zigzag manner comprising staggered longitudinal portions 27 and 29 joined by means of transverse offsets 28 positioned beneath and parallel to the courses 11, as illustrated in Fig. 3. The offset portions 28 are bound to the courses 11 by means of sheet metal bands 30.

An important feature of the present invention resides in the fact that the spring back is so constructed that it will variably yield in response to forces resulting when the passenger leans against the back rest with varying degrees of force. Moreover, the improved construction is such that the variable resistance of the spring structure will substantially uniformly increase or decrease in any given direction, thus resulting in a structure which will not have relatively high and low spots in any region. It will be noted that the courses 11 span the base and are unsupported preferably throughout their length intermediate the bowed leg sections. Furthermore, it will be noted that the upper leg sections are in the present instance provided with coils so as to increase the yieldability of the back along its entire upper edge. Consequently, the upper and lower ends of the crowned courses are unbalanced as to their relative degrees of compressibility, the entire upper side of the back being substantially more yieldable than the entire lower side thereof. I have discovered, as a result of this construction, that a spring back may be provided which will yield to a maximum extent at its central regions and in which the resistance of the spring members to pressure will progressively increase from the central region toward both the top and bottom edges but at a disproportionately greater rate toward the bottom than toward the top. Consequently, in viewing Figs. 5 and 6 and noting the contour of the back of a passenger, it will be seen that the upper part of the spring structure will more readily move inwardly under the pressure applied in the region of the shoulders of the passenger, and that this yieldability will desirably increase to a point at about the middle of the back of the passenger. From this point the resistance to collapsing force applied when the passenger leans back with more or less pressure, will gradually and substantially uniformly increase in a downward direction until the greatest resistance, and consequently the greatest support for the passenger, will be applied at the lower end or small of the back. As a result it will be seen from Figs. 5 and 6 that the proper varying degrees of yieldability will be available at the shoulders and at the middle of the back of the passenger and that a strong yielding supporting pressure will be exerted at the small of the back where firmer support is desirable to give the greatest comfort to the passenger.

I claim:

1. A spring back structure including spaced upright spring members forming substantially parallel outer courses terminating at their upper and lower ends in inwardly extending bowed leg sections of zig-zag shape connected to the frame of the structure, said upper leg sections being additionally formed with spring loops to increase the flexibility thereof relative to the lower leg sections and adapted to supply increased resiliency to the upright spring members to supplement the resiliency of the bowed leg sections, said courses being unsupported intermediate the leg sections to provide greater yieldability centrally of the courses than at their extremities so that the spring back structure is readily yieldable under progressively increasing resistance from the center towards the ends but at a disproportionately greater rate toward the lower end than the upper end so as to conform to the contour of the human back when subjected to compressive force thereby, and longitudinal members for tying said courses together in substantially parallel relation.

2. A spring back structure including spaced upright spring members forming substantially parallel outer courses terminating at their upper and lower ends in inwardly extending bowed legs sections of zig-zag shape connected to the frame of the structure, said upper leg sections being additionally formed with spring loops to increase the flexibility thereof relative to the lower leg sections and adapted to supply increased resiliency to the upright spring members to supplement the resiliency of the bowed leg sections, said courses being unsupported intermediate the leg sections to provide greater yieldability centrally of the courses than at their extremities so that the spring back structure is readily yieldable under progressively increasing resistance from the center towards the ends but at a disproportionately greater rate toward the lower end than the upper end so as to conform to the contour of the human back when subjected to compressive force thereby.

ALBERT P. BALL.